Sept. 24, 1968  R. C. JOHNSON ET AL  3,402,621
ADJUSTABLE ECCENTRIC
Filed Jan. 5, 1966  2 Sheets-Sheet 1
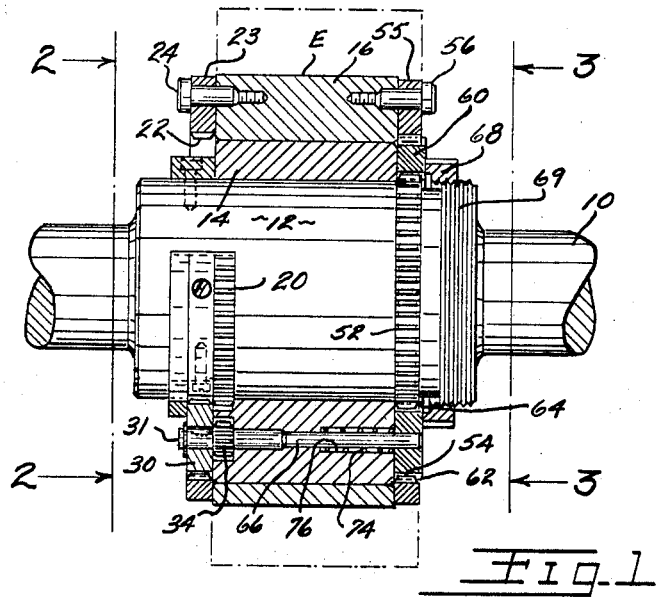
Fig. 1
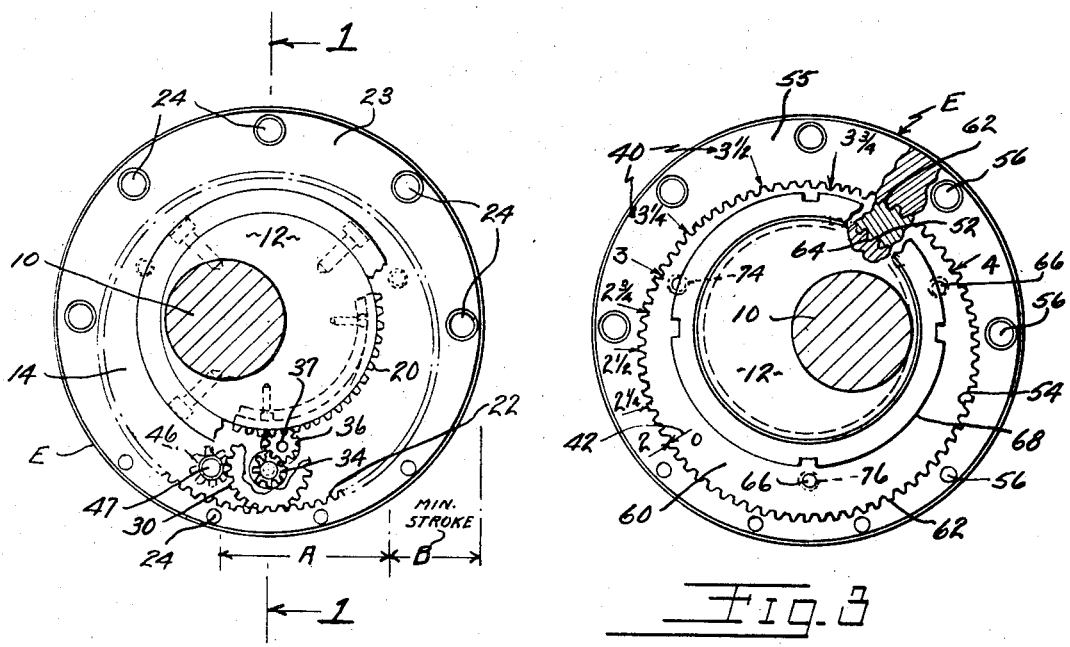
Fig. 2
Fig. 3
INVENTOR
ROBERT C. JOHNSON
ROBERT E. REQUARTH
BY Baldwin, Doran & Egan
ATTORNEYS Sept. 24, 1968   R. C. JOHNSON ET AL   3,402,621
ADJUSTABLE ECCENTRIC
Filed Jan. 5, 1966   2 Sheets-Sheet 2

INVENTOR
ROBERT C. JOHNSON
BY ROBERT E. REQUARTH
Baldwin, Doran & Egan
ATTORNEYS United States Patent Office 3,402,621
Patented Sept. 24, 1968

3,402,621
ADJUSTABLE ECCENTRIC
Robert C. Johnson, Chagrin Falls, and Robert E. Requarth, Fairview Park, Ohio, assignors to Standard Pressed Steel Co., Jenkentown, Pa., a corporation of Pennsylvania
Filed Jan. 5, 1966, Ser. No. 518,814
8 Claims. (Cl. 74—571)

ABSTRACT OF THE DISCLOSURE

A variably adjustable eccentric mechanism including a rotary shaft, a first eccentric secured to the shaft, a second eccentric rotatably mounted on the first eccentric, and a third eccentric rotatably mounted on the second eccentric. The rotatable eccentrics may be locked in any preselected rotative position by adjustable locking gears including a spur gear on the first eccentric, an internal gear on the third eccentric, and a locking ring gear on the second eccentric having external teeth meshable with the internal gear and having internal teeth meshable with the spur gear. The ring gear is movable axially into meshing engagement with the spur gear and the internal gear to lock the rotatable eccentrics in selective rotative positions. Rotation of the second and third eccentrics to selective rotative positions is effected with a coacting gear train suitably connected to the first eccentric and to the second and third eccentrics, such gear train being manually operable.

---

This invention relates to adjustable eccentrics and more particularly to adjustable eccentrics used to vary the length of stroke of reciprocatory members.

In many types of reciprocating mechanisms, it is frequently necessary to vary the length of stroke of the reciprocating member therein. For example, in presses used for bolt making, parts forming, trimming, swaging, etc., the adjustable stroke feature is particularly useful when properly integrated with variable crankshaft speed to achieve maximum pieces per minute within acceptable slide speed values. From an economy viewpoint, when a job requires a stroke greater than that of a fixed eccentric shaft, it is necessary to run that job on a larger tonnage capacity press in order to gain the necessary stroke length. An alternative to using the larger press is to spend several days changing the crank and pitman.

Therefore, it is an object of the invention to provide a simple variable stroke mechanism whereby the stroke of a reciprocating element may be readily adjusted in a predetermined range stroke by a simple operation.

A further object of the invention is the provision of a variable stroke mechanism adaptable to variable speed drive to maintain optimum press slide speed.

A further object of the invention is the provision of a variable stroke mechanism whereby full tonnage is delivered on centerline at the end of the stroke.

A further object of the invention is to provide a single rapid adjustment for changing eccentricity to insure dependable, functional performance requirements of the variable stroke mechanism.

A further object of the invention is to provide a variable stroke mechanism wherein the crank achieves maximum mechanical advantage on centerline of the basic throw at the end of any adjusted stroke.

A further object of the invention is to provide a variable stroke mechanism that is simple in construction, inexpensive to manufacture, and highly effective in operation.

Briefly, the foregoing objects are effected by a variably adjustable eccentric mechanism including a rotary shaft, a first eccentric secured to the shaft, and a second eccentric rotatably mounted on the first eccentric, and a third eccentric rotatably mounted on the second eccentric. Gear locking means are provided for locking the rotatable eccentrics in any of their preselected rotative positions, such means including a spur gear on the first eccentric, an internal gear on the third eccentric, and a locking ring gear on the second eccentric having external teeth meshable with the internal gear and having internal teeth meshable with the spur gear. The ring gear is movable axially into meshing engagement with the spur gear and the internal gear to lock the rotatable eccentrics in selective rotative positions. To facilitate rotation of the second and third eccentrics to selective rotative positions, the mechanism is provided with a coacting gear train suitably connected to the first eccentric and to the second and third eccentrics, such gear train being manually operable. The mechanism is mounted in coaction with an associated reciprocating element to vary the stroke of the same. Thus, there is provided a triple eccentric variably adjustable stroke mechanism wherein the eccentricity thereof is easily changed by a simple operation. Additionally, the mechanism achieves maximum mechanical advantage on the centerline of the basic throw at the end of any adjusted stroke.

Other objects and advantages of the invention will become apparent from the following description taken in conjunction with the drawings wherein:

FIG. 1 is a front elevational sectional view of an adjustable eccentric mechanism constructed in accordance with the invention and taken along the line 1—1 of FIG. 2;

FIG. 2 is a view taken along the line 2—2 of FIG. 1, and showing the device set for minimum stroke;

FIG. 3 is a view taken along the line 3—3 of FIG. 1;

Figure 4:
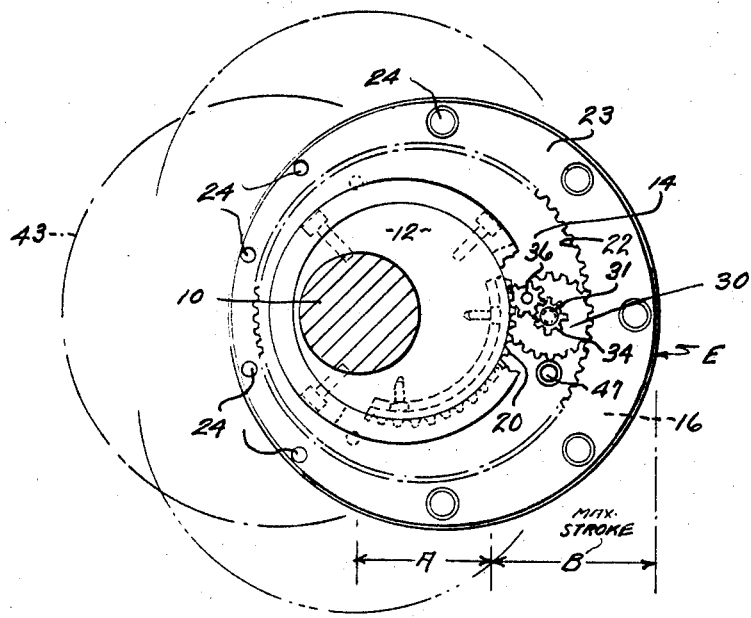
FIG. 4 is a view similar to FIG. 2, but showing the mechanism set for maximum stroke.

Although the invention is shown and described herein with respect to its use with a bolt making machine, it will be understood that it may be applied to any type of mechanism containing a reciprocating element wherein the stroke thereof must be selectively adjusted.

Referring to FIGS. 1 through 4, there is shown a variably adjustable eccentric mechanism E of the invention and including, in the preferred form, a rotary main shaft 10, a first eccentric 12 secured to the shaft 10, and a second eccentric 14 rotatably mounted on the first eccentric, and a third eccentric 16 rotatably mounted on the second eccentric.

To facilitate rotation of the second and third eccentrics to preselected rotative positions, an interconnected gear train is provided on the eccentrics, now to be described. The first eccentric 12 is provided with first eccentric gear means in the form of a spur gear or spur gear segment 20. The third eccentric 16 is provided with third eccentric gear means in the form of the internal gear (segment) 22 formed on the inner periphery of the internal gear ring 23 which is secured to the third eccentric by the bolts 24. The second eccentric is provided with second eccentric gear means in the form of the spur gear 30 fixed to the shaft 31, a first pinion gear 34 also secured to the shaft 31, and a second pinion gear 36 rotatably mounted on the shaft 37 and meshing with the first pinion gear 34 and with the spur gear segment 20 (on the first eccentric), said shafts 31 and 37 being mounted on the second eccentric. Thus, by rotating the spur gear 30, the third eccentric is selectively rotated about the second eccentric 14, and the second eccentric 14 is selectively rotated about the first eccentric, thereby preselectively adjusting the eccentricity of the eccentric mechanism E.

To facilitate selection of rotative eccentric positions, the third eccentric is provided with a graduated scale 40 and the second eccentric is provided with a coacting matching "zero" indicator arrow 42 as shown in FIG. 3 wherein a minimum setting is indicated, such minimum setting being, in the present example, a stroke of two inches. In FIG. 4, the mechanism E is set at maximum stroke with the arrow B representing the length of such maximum stroke, and the arrow A representing the distance from the center of the shaft 10 to the outer right edge of the mechanism E when such mechanism is rotated 180° to the position 43 indicated in dot-dash lines. In like manner, FIG. 2 illustrates the minimum stroke setting wherein arrow B represents the length of such minimum stroke, and arrow A represents the distance from the center of the shaft 10 to the outer right edge of the mechanism E when the same is rotated 180° from the position shown.

To facilitate rotation of the spur gear 30 to effect such aforementioned settings, there is provided a pinion gear 46 (meshing with the gear 30) rotatably mounted on the hollow splined shaft 47 which is secured to the second eccentric 14. The pinion gear 46 is adapted to receive an associated spline wrench (not shown) in the splined bore of the shaft 47 for ease in turning the gear 46.

Once the eccentrics 14 and 16 have been rotated to any given preselected rotative position, they may be detachably locked in any such position by a locking means now to be described. The first eccentric 12 is provided with a first eccentric gear means in the form of the spur gear 52 disposed on an axis parallel to longitudinal axis of the shaft 10. The third eccentric 16 is provided with a third eccentric gear means formed within the inner periphery of the third eccentric in the form of the internal gear 54 disposed on the inner periphery of the internal gear ring 55 which, in turn, is secured to the third eccentric by the bolts 56, said internal gear 54 being disposed in the same plane as the spur gear 52. The second eccentric 14 is provided with second eccentric gear means in the form of a locking ring gear 60 which is movable axially (and parallel to the longitudinal axis of the shaft 10) on such said second eccentric, but may not be circumferentially rotated thereon. The locking gear 60 has external gear teeth 62 adapted to mesh with the internal gear 54 on the third eccentric. Also, the locking gear 60 has internal gear teeth 64 adapted to mesh with the spur gear 52 on the first eccentric.

The locking ring gear 60 is detachably retained in locked meshed engagement with the first eccentric spur gear 52 and with the third eccentric internal gear 54 by a lock nut 68 disposed on the threads 69 on the first eccentric 12. The nut 68 thus abuts against the locking the locking ring gear 60 which is biased outwardly against the nut by a suitable bias means such as, for example, a plurality of compressed elongated coil springs 74 each contained in a bore 76 and abutting at their inner end against the inner end of the bore and at their outer end against the locking ring gear 60. The pins 66 align the gear 60 with the eccentric 14.

Figure 5:
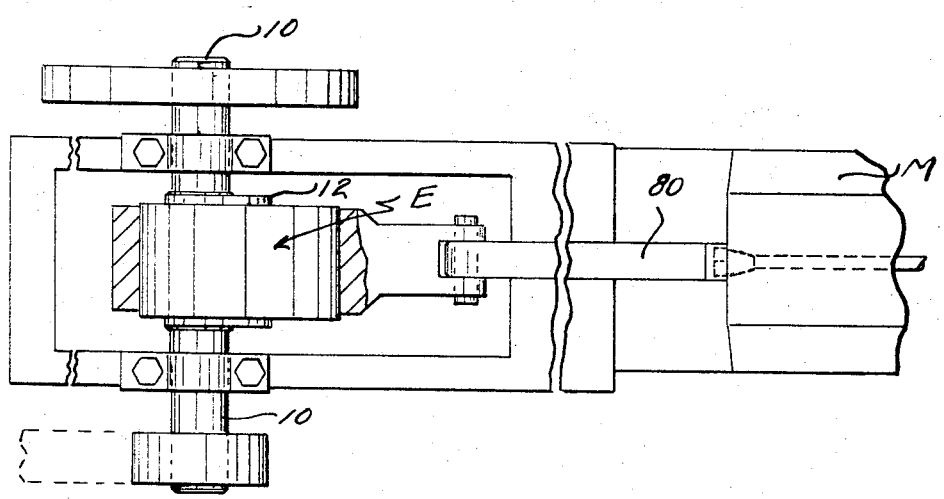
FIG. 5 is a top plan view showing the invention connected to the crank of an associated reciprocating mechanism such as a bolt making machine.

In practice, the variable eccentric mechanism E is employed in combination with a reciprocating mechanism such as a bolt making machine M, having a reciprocating member 80 as shown in FIG. 5, the stroke of such member 80 being adjustable by changing the eccentricity of the mechanism E as aforedescribed.

We claim:

1. A variably adjustable eccentric mechanism comprising, a rotary shaft, a first eccentric secured to said shaft, a second eccentric rotatably mounted on said first eccentric, a third eccentric rotatably mounted on said second eccentric, and locking means for detachably locking the second eccentric to the first eccentric and to the third eccentric in preselected rotative positions for adjusting the eccentricity of the mechanism, said locking means including first eccentric gear means on said first eccentric, third eccentric gear means on said third eccentric, and second eccentric gear means on said second eccentric detachably engageable with the first eccentric gear means and with the third eccentric gear means for detachably locking the second eccentric to the first eccentric and to the third eccentric in preselected rotative positions.

2. The structure of claim 1 wherein said first eccentric gear means is a spur gear and said third eccentric gear means is an internal gear.

3. A variably adjustable eccentric mechanism comprising, a rotary shaft, a first eccentric secured to said shaft, a second eccentric rotatably mounted on said first eccentric, a third eccentric rotatably mounted on said second eccentric, and locking means for detachably locking the second eccentric to the first eccentric and to the third eccentric in preselected rotative positions for adjusting the eccentricity of the mechanism, said locking means comprising a spur gear secured to said first eccentric and disposed on an axis parallel to the longitudinal axis of the shaft, an internal gear formed on said third eccentric and disposed in substantially the same plane as the spur gear, a locking ring gear secured to the second eccentric and adapted for movement on an axis parallel to the longitudinal axis of the shaft, said locking ring gear having external gear teeth detachably meshable with said internal gear and having internal gear teeth detachably meshable with said spur gear, and means for moving and detachably retaining said locking ring gear in mesh with said spur gear and said internal gear.

4. The structure of claim 3 wherein said last-named means comprises a lock nut threaded on said first eccentric on an axis parallel to the longitudinal axis of the shaft, said lock nut threadedly abutting said ring gear to detachably retain the same in preselected rotative positions in mesh with said spur gear and said internal gear, and bias means for biasing said ring gear in abutment with said lock nut.

5. The structure of claim 4 wherein said bias means comprises a plurality of compressed, elongated coil springs contained on said second eccentric peripherally about the center thereof in parallel spaced relation, each of said springs abutting said ring gear to bias the same into engagement with the lock nut.

6. A variably adjustable eccentric mechanism comprising, a rotary shaft, a first eccentric secured to said shaft, a second eccentric rotatably mounted on said first eccentric, a third eccentric rotatably mounted on said second eccentric, and coacting locking means for selectively rotating said second eccentric about said first eccentric and said third eccentric about said second eccentric into predetermined rotative positions to adjust the eccentricity of said mechanism and for detachably locking said second eccentric to said first eccentric and to said third eccentric in said predetermined rotative positions, said coacting locking means including first eccentric gear means on said first eccentric, third eccentric gear means on said third eccentric, and second eccentric gear means on said second eccentric meshed with said first eccentric gear means and with said third eccentric gear means, whereby rotation of said second eccentric gear means effects rotation of said second and third eccentrics to said predetermined rotative positions.

7. The structure of claim 6 wherein said coacting locking means comprises an internal gear formed within the periphery of the third eccentric and having its longitudinal axis parallel to the shaft longitudinal axis, a spur gear secured to the first eccentric on an axis parallel to the shaft longitudinal axis, a spur gear mounted on the second eccentric and meshed with the internal gear, a pinion gear mounted on the second eccentric on the axis of the second-named spur gear, and a second pinion gear mounted on the second eccentric on an axis parallel to the shaft longitudinal axis, said second pinion gear meshed with the first-named pinion gear and with the first-named spur gear whereby rotation of the second-named spur gear effects coactive rotation of the second eccentric and the third eccentric to preselected rotative positions.

8. The structure of claim 7 and further including a pinion gear meshed with the second-named spur gear, said last-named pinion gear adapted to axially receive a spline wrench for rotating the same and thereby rotating the second and third eccentrics to preselected rotative positions.

References Cited

UNITED STATES PATENTS

| | | | |
|---|---|---|---|
| 1,565,264 | 12/1925 | Dubi | 74—571 |
| 2,561,344 | 7/1951 | Cutler et al. | 74—571 |

MILTON KAUFMAN, *Primary Examiner.*